(12) United States Patent
Horgan

(10) Patent No.: US 10,507,750 B2
(45) Date of Patent: Dec. 17, 2019

(54) METHOD AND APPARATUS FOR MAGNETIC AUTO UPHOLSTERY PANEL

(71) Applicant: Ian M Horgan, Colorado Springs, CO (US)

(72) Inventor: Ian M Horgan, Colorado Springs, CO (US)

(*) Notice: Subject to any disclaimer, the term of this patent is extended or adjusted under 35 U.S.C. 154(b) by 38 days.

(21) Appl. No.: 15/646,216

(22) Filed: Jul. 11, 2017

(65) Prior Publication Data

US 2018/0009355 A1 Jan. 11, 2018

Related U.S. Application Data

(60) Provisional application No. 62/360,573, filed on Jul. 11, 2016.

(51) Int. Cl.
*B60N 2/72* (2006.01)
*B60N 2/70* (2006.01)
*B60R 13/02* (2006.01)

(52) U.S. Cl.
CPC ............. *B60N 2/72* (2013.01); *B60N 2/7005* (2013.01); *B60R 13/02* (2013.01); *B60R 13/0206* (2013.01)

(58) Field of Classification Search
CPC .......................................................... B60N 2/72
USPC ............................................................. 428/99
See application file for complete search history.

(56) References Cited

U.S. PATENT DOCUMENTS 5,112,092 A * 5/1992 Pucci ........................ B60J 5/00
280/770

* cited by examiner

*Primary Examiner* — Brent T O'Hern
(74) *Attorney, Agent, or Firm* — Brenda L. Speer, LLC; Brenda L. Speer

(57) ABSTRACT

A magnetic auto upholstery panel has an upholstery fabric layer. A foam layer has a first side and a second side. The first side of the foam layer is adhered to the upholstery fabric layer. At least a magnet (or several) is attached to the second side of the foam layer. The magnetic auto upholstery panel is then placed in the desired position within the vehicle and the magnets attached to exposed metal surfaces. This is much faster than prior art methods and therefore saves the customer money, but it also is much easier to correct any mistakes made when installing auto upholstery.

5 Claims, 4 Drawing Sheets

METHOD AND APPARATUS FOR MAGNETIC AUTO UPHOLSTERY PANEL

RELATED APPLICATIONS

The present application claims priority on U.S. Provisional Patent Application, application No. 62/360,573, filed on Jul. 11, 2016, entitled Magnetic Auto Panel, and is hereby incorporated by reference.

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Vehicles have upholstery throughout the interior of the car to provide sound reduction and improve the look of the vehicles interior. Auto upholstery panels are often used to cover the inside of doors and other parts of the vehicle. Today most auto upholstery is attached to the inside of the vehicle by panel clips, glue or with some permanent alteration to the structure of the vehicle. This process is slow, time consuming, and expensive. This is particularly the case in custom vehicles.

Thus there exists a need for an auto upholstery panel that is inexpensive and easy to install.

BRIEF SUMMARY OF INVENTION

A magnetic auto upholstery panel that overcomes these and other problems has an upholstery fabric layer. A foam layer has a first side and a second side. The first side of the foam layer is adhered to the upholstery fabric layer. A magnet (or several) is attached to the second side of the foam layer. The magnetic auto upholstery panel is then placed in the desired position within the vehicle and the magnets attached to exposed metal surfaces. Not only is this much faster than present methods and therefore saves the customer money, but it also is much easier to correct any mistakes made when installing auto upholstery.

DETAILED DESCRIPTION OF THE INVENTION

The invention relates to a magnetic auto upholstery panel that has an upholstery fabric layer. A foam layer has a first side and a second side. The first side of the foam layer is adhered to the upholstery fabric layer. At least a magnet (or several) is attached to the second side of the foam layer. The magnetic auto upholstery panel is then placed in the desired position within the vehicle and the magnets attached to exposed metal surfaces. Not only is this much faster than present methods and therefore saves the customer money, but it also is much easier to correct any mistakes made when installing auto upholstery.

Figure 1:
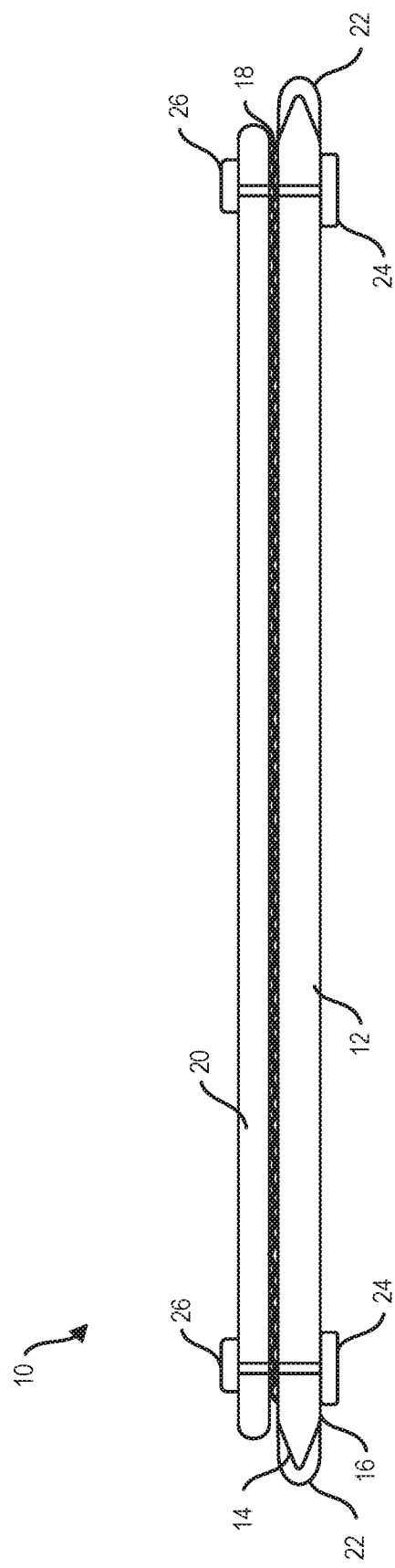
FIG. 1 is a cross section of a magnetic auto upholstery panel in accordance with one embodiment of the invention.

FIG. 1 is a cross section of a magnetic auto upholstery panel 10 in accordance with one embodiment of the invention. The panel 10 has a flexible foam layer 12 with a first side 14 and a second side 16. An adhesive layer 18 is applied to the first side 14 of the flexible foam layer 12. The adhesive layer 18 holds an automotive upholstery 20 to the foam layer 12. In one embodiment, the adhesive is a contact cement. An edge binding 22 is sewn along the perimeter panel of the panel 10. At least a magnet 24 is attached to the second side 16 of the foam layer 12. In one embodiment, the magnet 24 is a ring magnet and it is held in place by a rivet 26.

In one embodiment, the automotive upholstery 20 is adhered to the foam layer by flame lamination. This is a process used to produce laminates by bonding foam to various fabrics and substrates by passing the foam over an open flame. Exposure to the flame creates a thin layer of molten polymer on the foam surface, which is then brought into contact with the secondary layer under pressure to develop a bond between the two surfaces.

Figure 2:
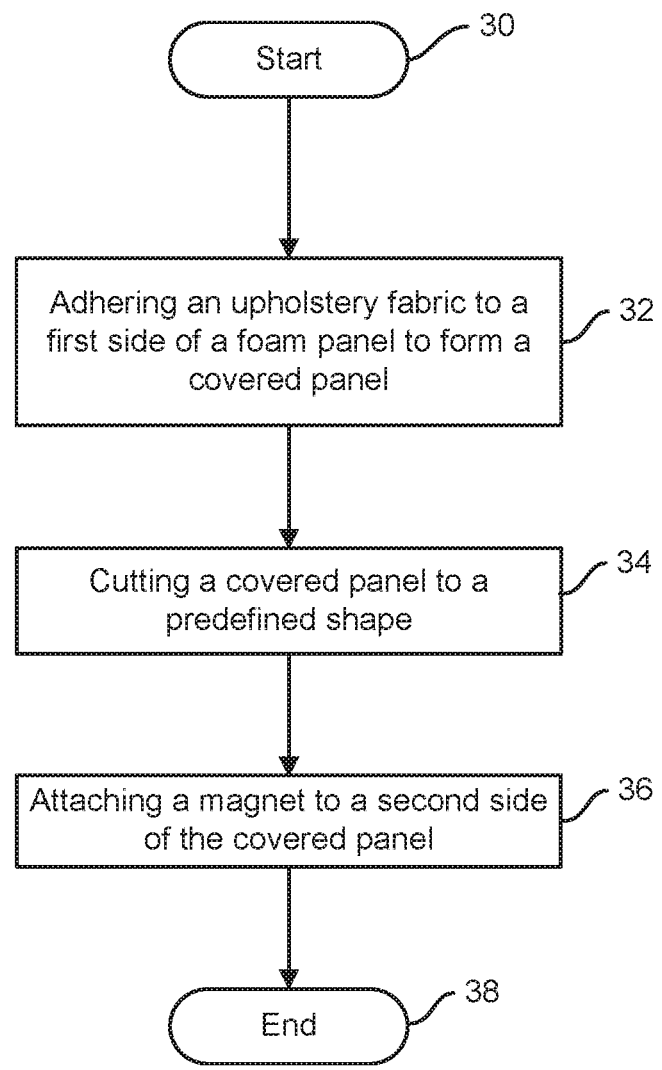
FIG. 2 is a flow chart of the steps used by a method of creating a magnetic auto panel in accordance with one embodiment of the invention.

FIG. 2 is a flow chart of the steps used by a method of creating a magnetic auto panel in accordance with one embodiment of the invention. The process starts, step 30, by adhering an upholstery fabric to a first side of a foam panel to form a covered panel at step 32. The covered panel is cut into a predefined shape at step 34. At step 36, at least a magnet is attached to a second side of the covered panel which ends the process at step 38. The magnetic auto panel is easy to install by just attaching the magnets to the appropriate metal portion of the interior of the vehicle.

In one embodiment the foam is a flexible foam. In another embodiment, the step of adhering includes the step of applying an upholstery contact cement to the foam panel. In another embodiment, the step of cutting includes the step of sewing an edge binding along a perimeter of the covered panel. In yet another embodiment, the step of attaching the magnet includes the step of creating an opening in the covered panel. In another embodiment the method includes the step of attaching a female part of a mate rivet over the opening. Then placing a ring magnet over the female part of the mate rivet and inserting a male part of the mate rivet through the female part of the mate rivet and the ring magnet and cinching the rivet.

Figure 3:
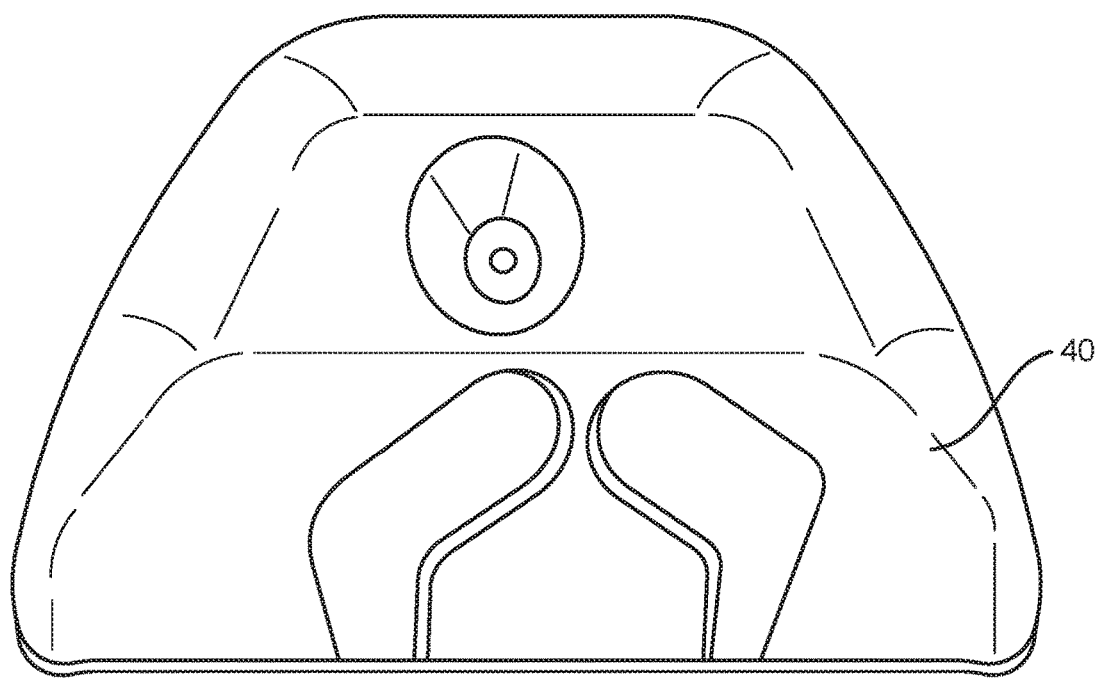
FIG. 3 is front view of a wheel well of a vehicle without any upholstery.

FIG. 3 is front view of a wheel well 40 of a vehicle without any upholstery. This is a particularly difficult surface to cover with upholstery. If glue is used to adhere the upholstery it is going to require precision to properly place the upholstery into position and hold it there until the glue is sufficiently dry (cured). It is easy for the glue to get on the upholstery and damage the look. Wheel wells do not lend themselves to panel clips to hold the upholstery.

Figure 4:
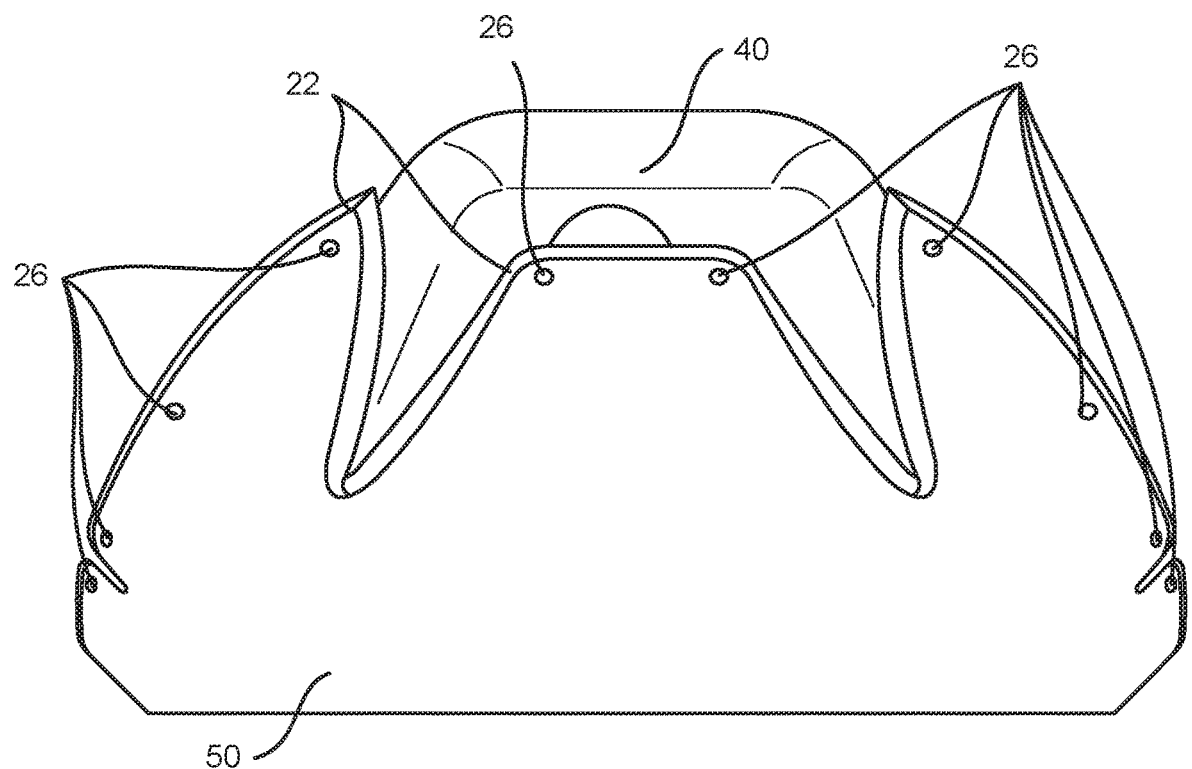
FIG. 4 is a front view of a magnetic auto upholstery panel designed to fit the wheel well in accordance with one embodiment of the invention.

FIG. 4 is a front view of a magnetic auto upholstery panel 50 designed to fit the wheel well 40 in accordance with one embodiment of the invention. The upholstery panel 50 is cut into a specific pattern. Note the rivets 26 and the edge binding 22 on the panel 50.

Figure 5:
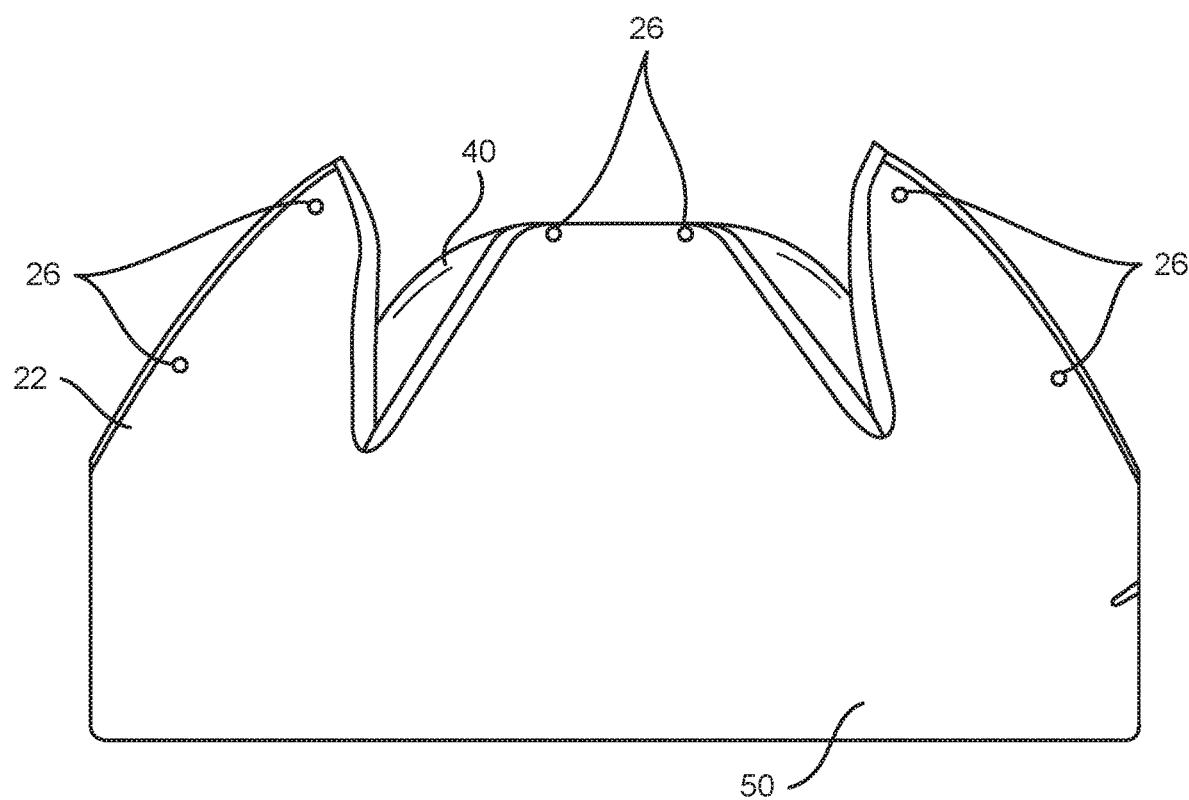
FIG. 5 is a front view of the magnetic auto upholstery panel with some of the magnets attached to the wheel well in accordance with one embodiment of the invention.

FIG. 5 is a front view of the magnetic auto upholstery panel 50 with some of the magnets 26 attached to the wheel well 40 in accordance with one embodiment of the invention. This is the next step in attaching the upholstery panel 50.

Figure 6:
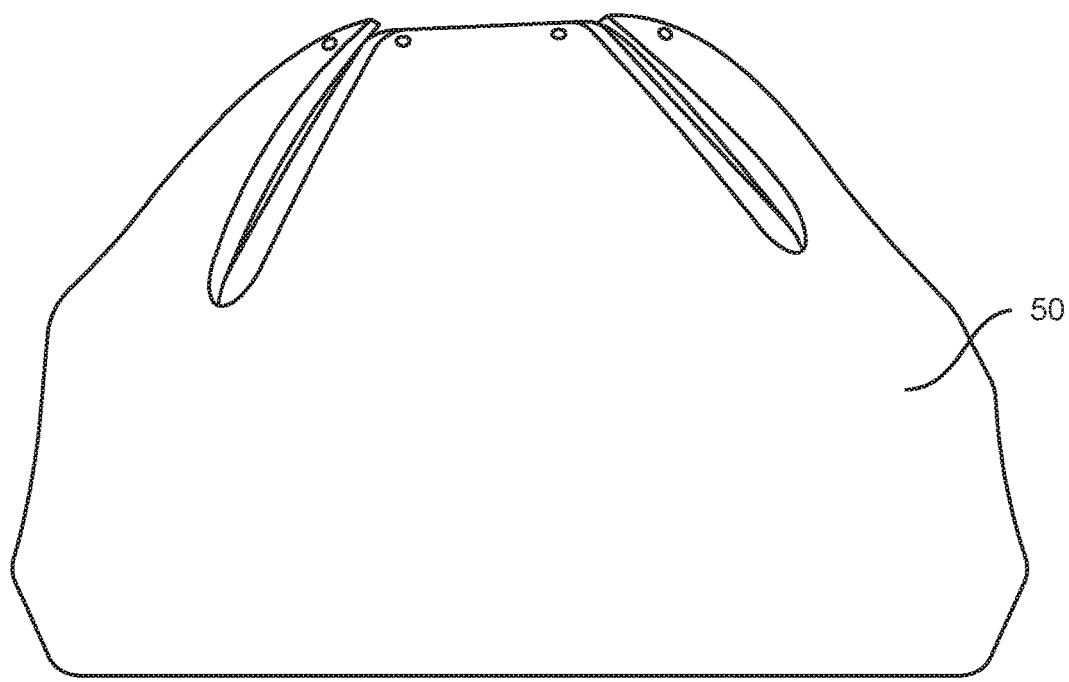
FIG. 6 is a front view of the upholstered wheel well in accordance with one embodiment of the invention.

FIG. 6 is a front view of the upholstered wheel well in accordance with one embodiment of the invention. The magnetic auto upholstery panel is simple, quick, and inexpensive to install.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A magnetic auto upholstery panel, comprising:
   a foam panel, wherein the foam panel is cut to have a predefined pattern;
   an upholstery fabric layer attached to the foam panel, wherein the upholstery fabric layer is adhered to the foam panel; and
   at least a magnet attached to the foam layer;
   wherein the foam panel has a first side and a second side and the upholstery fabric layer covers only the first side.

2. The magnetic auto upholstery panel of claim 1, further including an edge binding along a perimeter of the foam panel.

3. The magnetic auto upholstery panel of claim 1, further including a rivet extending through the foam panel and holding the magnet.

4. The magnetic auto upholstery panel of claim 3, wherein the magnet is a ring magnet.

5. A magnetic auto upholstery panel, comprising:
   an upholstery fabric layer;
   a foam layer having a first side and a second side, the first side of the foam layer adhered to the upholstery fabric layer; and
   a plurality of magnets attached to the second side of the foam layer; wherein each magnet is attached to the foam layer by a rivet.

* * * * *